United States Patent [19]

Levine et al.

[11] 4,198,288

[45] Apr. 15, 1980

[54] DESLIMING OF POTASH ORES

[75] Inventors: Nathan M. Levine; Walter Von Drathen, both of Louisville, Ky.

[73] Assignee: Celanese Polymer Specialties Company, Louisville, Ky.

[21] Appl. No.: 22,655

[22] Filed: Mar. 22, 1979

[51] Int. Cl.² .............................................. B03D 1/02
[52] U.S. Cl. ........................................ 209/5; 209/166
[58] Field of Search .................... 209/166, 5; 252/61; 210/54 C

[56] References Cited

U.S. PATENT DOCUMENTS

| | | | |
|---|---|---|---|
| 2,336,015 | 12/1943 | Jayne | 209/166 |
| 2,341,046 | 2/1944 | Kirby | 209/166 |
| 2,494,132 | 1/1950 | Jayne | 209/166 |
| 2,569,672 | 10/1951 | Jackson | 209/166 |
| 2,696,912 | 12/1954 | Atwood | 209/166 |
| 2,708,666 | 5/1955 | Carpenter | 209/166 X |
| 2,730,505 | 1/1956 | Jordan | 209/166 X |
| 2,923,408 | 2/1960 | Williams | 209/166 |
| 3,078,271 | 2/1963 | De Groote | 252/61 X |
| 3,095,282 | 6/1963 | Wilson | 209/5 X |
| 3,179,250 | 4/1965 | Bunge | 209/166 |
| 3,259,237 | 7/1966 | Schoeld | 209/9 |
| 3,321,049 | 5/1967 | De Benedictis | 209/166 X |
| 3,452,687 | 7/1969 | Bishop | 209/166 |
| 3,523,892 | 8/1970 | Schiegg | 210/54 C X |
| 3,738,945 | 6/1973 | Panzer | 210/54 C X |
| 3,746,678 | 7/1973 | Dick | 210/54 C X |
| 3,782,546 | 1/1974 | Kirwin | 209/166 |
| 3,805,951 | 4/1974 | Brogoitti | 209/166 X |
| 3,953,330 | 4/1976 | Tonkyn | 210/52 |

FOREIGN PATENT DOCUMENTS

| | | | |
|---|---|---|---|
| 119341 | 1/1945 | Australia | 209/166 |
| 1241821 | 8/1960 | France | 209/166 |
| 1372911 | 8/1964 | France | 252/61 |

*Primary Examiner*—Robert Halper
*Attorney, Agent, or Firm*—Herbert P. Price; K. A. Genoni; T. J. Morgan

[57] ABSTRACT

An improved process for desliming potash ore, which involves treating pulped potash ore with a polygalactomannan gum flocculant and then with a polyamine collector. The treated potash ore is subjected to froth flotation to float off the siliceous gangue.

10 Claims, No Drawings

DESLIMING OF POTASH ORES

BACKGROUND OF THE INVENTION

Potash froth flotation is a conventional process for recovering potash values from ore pulps. Potash ores mined in the United States and Canada normally contain between about 5–50 percent sylvite (KCl). Other components of potash ore can include carnallite, langbeinite, kieserite, halite (NaCl) and gangue materials. Most often the gangue materials found with sylvite ores include halite, clays, (e.g., montmorillonite) and gypsum along with minor amounts of iron oxides, manganese oxides and other minerals.

The siliceous gangue (i.e., clay) interferes with the recovery of potash values from potash-containing ores, whether the recovery is a flotation or heavy media separation or dissolution procedure. Thus, the deleterious effects of siliceous gangue during potash recovery are manifold. In flotation processes the slime-like gangue absorbs the expensive flotation agents. In differential settling in heavy media, the siliceous slime prevents efficient setting rates. In dissolution processing, the slime absorbs up to five times its weight in potash saturated brine and interferes with thickening and filtration.

A series of technical developments have addressed the problems characteristic of siliceous slimes which are present during the recovery of potash values from potash-containing ores. Mechanical means of desliming potash ores, which commonly employ equopment such as cyclones, filters and centrifuges, are non-selective and inefficient and result in an uneconomical loss of potash values.

U.S. Pat. No. 3,095,282 describes an improved process for recovering potash values from sylvinite ores which contain slime-forming clay. The process involves crushing the ore and dissolving the crushed ore in an aqueous brine solution, wherein the brine is saturated with respect to NaCl and unsaturated with respect to KCl. The KCl of the sylvinite ore dissolves in the brine solution and the NaCl of the sylvinite ore remains substantially undissolved, and the clay content of the ore remains suspended in the brine solution. The said brine solution containing suspended clay and undissolved NaCl is decanted, and to the decanted brine is added 0.0005–0.01 percent, based on the ore weight, of a flocculant selected from acrylic and methacrylic polymers. The suspended clay is caused to adhere to the undissolved NaCl, and it rapidly settles out to yield a substantially clear brine solution which contains dissolved potash values.

U.S. Pat. No. 3,782,546 describes a potash froth flotation process which involves the steps of grinding the potash ore, mixing the ground ore with brine to form an ore pulp, aerating the pulp to form a froth of potash values, and collecting and processing the froth. The improvement in the process consists of adding to the ore pulp prior to frothing a water soluble, high molecular weight diallyl dialkyl quaternary ammonium polymer as a blinding agent for the clay slime. The blinding agent selectively coagulates the slime.

U.S. Pat. No. 3,805,951 describes a process for desliming sylvinite ores by a selective flocculation and froth flotation of the slime. The process involves treating the ore pulp with a high molecular weight acrylamide polymer to flocculate the slime and then with a cationic collector for the flocculated slime. The treated ore pulp is subsequently subjected to froth flotation to float off the flocculated slime.

There is continuing research effort to develop improvements in processes for separating potash values from sylvinite type of ores.

Accordingly, it is a main object of this invention to provide an improved process for improving the efficiency of potash recovery from sylvinite ores.

It is another object of this invention to provide a pretreatment procedure for the selective flocculation and froth flotation of the siliceous slime content of potash ores.

It is a further object of this invention to provide a novel combination of flocculant and collector agents for the desliming of potash ore pulp before the recovery of potash values.

Other objects and advantages of the present invention shall become apparent from the accompanying description and examples.

DESCRIPTION OF THE INVENTION

One or more objects of the present invention are accomplished by the provision of a process for desliming a potash ore which comprises (1) scrubbing the ore in saturated brine, (2) treating the pulped ore with about 0.005–0.5 pound per ton of a polygalacetomannan gum flocculant, and with about 0.01–1.0 pound per ton of a polyamine collector for the siliceous slime, (3) subjecting the treated ore pulp to froth flotation conditions, and (4) removing the floated siliceous slime; wherein the polyamine collector is a composition corresponding to the formula:

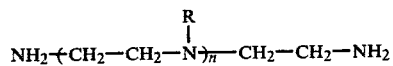

where R is an aliphatic substituent containing between about 8–24 carbon atoms and between about 1–3 oxygen atoms and is derived from a monoepoxide, n is the integer 1 or 2, and one of the R substituents can be hydrogen when n is 2.

The desliming process is applicable to any of the various types of potash ores, and the invention process is especially advantageous when applied to sylvinite ores which contain high slimes up to about 6 percent or more. Potash ores which typically have a high siliceous gangue content are among those which are mined in New Mexico and Saskatchewan.

The particles of the potash ore pulp will normally have maximum sizes in the range of about 4 mesh and 10 mesh, i.e., a particle size suitable for froth flotation techniques applicable to the recovery of potash values from potash ores.

Polygalactomannan Gum Flocculant

The pulped ore is treated with between about 0.005–0.5 pound per ton, and preferably between about 0.025–0.25 pound per ton, of a polygalactomannan gum flocculant.

The term "polygalactomannan gum" is meant to include the natural gums, either crude or in a purified state, and derivatized forms of the gums in which at least part of the free hydroxyl groups are reacted to form ether groups, e.g., the derivatives which are obtained when the natural gums are subjected to Williamson ether synthesis or to Michael additions conditions.

Examples of derivatizing groups on the polygalactomannans are carboxyalkyl, e.g., carboxymethyl, hydroxyalkyl, e.g., hydroxyethyl or hydroxypropyl, carboxyalkyl-hydroxyalkyl, e.g., carboxymethyl-hydroxypropyl, and quaternary ammonium hydroxy alkyl, e.g., hydroxypropyl trimethyl ammonium chloride.

The polygalactomannans are polysaccharides composed principally of galactose and mannose units and are usually found in the endosperm of leguminous seeds, such as guar, locust bean, honey locust, flame tree, and the like. Guar flour, for example, is composed mostly of a galactomannan which is essentially a straight chain mannan with single membered galactose branches. The mannose units are linked in a 1-4-$\beta$-glycosidic linkage and the galactose branching takes place by means of a 1-6 linkage on alternate mannose units. The ratio of galactose to mannose in the guar polymer is, therefore, one to two.

Locust bean gum is also a polygalactomannan gum of similar molecular structure in which the ratio of galactose to mannose is one to four. Guar and locust bean gum are preferred sources of the polygalactomannans, principally because of the commercial availability thereof.

Polygalactomannan gums, such as guar, swell readily in cold water while locust bean gum dissolves in hot water to yield solutions which characteristically have a high viscosity even at a concentration of 1–1.5 percent. Guar gums supplied commercially usually have a viscosity (at 1% concentration) of around 1000 to 4000 centipoises at 25° C. using a Brookfield Viscometer Model LVF, spindle No. 2 at 6 rpm.

U.S. Pat. Nos. 2,891,050, 2,970,063, 3,132,681 and 3,543,823 describe various processes for treating the polygalactomannan seeds to produce dispersible powders.

Polygalactomannan gum derivatives are prepared by reacting the derivatizing agent, e.g., propylene oxide and chloroacetic acid, with the gum under such conditions that the agent reacts with the hydroxyl groups on the gum. U.S. Pat. Nos. 3,712,883 and 3,740,388 describe the preparation of carboxyalkyl derivatives of polygalactomannans by reacting the polygalactomannan with halo fatty acid reactants. Hydroxyalkyl ethers of polygalactomannans are described in U.S. Pat. Nos. 3,483,121 and 3,326,890 wherein the derivatizing agent is a monoepoxide. In U.S. Pat. No. 2,496,670, polyhydroxyalkyl ethers of polygalactomannan gums are made by reacting the gum with glycerol monochlorohydrin. Mixed carboxyalkyl, hydroxyalkyl ethers of polygalactomannans are described in U.S. Pat. No. 3,723,409. Cationic derivatives of polygalactomannans are shown in U.S. Pat. No. 3,303,184, aminoethyl ether, wherein the derivatizing agent is an alkylene imine, and in U.S. Pat. No. 3,498,912, a quaternary ammonium derivative, wherein the derivatizing agent can be 2,3-epoxypropyl trimethylammonium chloride or 3-chloro-2-hydroxypropyl trimethylammonium chloride. To the extent necessary to obtain a thorough understanding of this invention, the above patents are hereby incorporated by reference.

As demonstrated by the data summarized in the examples of the present specification, a polygalactomannan gum flocculating agent, when employed in combination with a polyamine collector is effective for the desliming of potash ores with a high degree of selectivity, i.e., a high selectivity ratio is achieved.

Polyamine Collector

As noted previously hereinabove, the present invention process requires the presence of a specific type of polyamine compound which functions as a collector for the siliceous gangue which has been selectively flocculated with a polygalactomannan gum flocculant. The said polyamine collector corresponds to the formula:

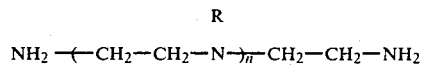

where R is an aliphatic substituent containing between about 8–24 carbon atoms and between about 1–3 oxygen atoms and is derived from a monoepoxide, n is the integer 1 or 2, and one of the R substituents can be hydrogen when n is 2.

Illustrative of the monoepoxides from which the aliphatic substituents corresponding to R in the above structure formula are derived are those compounds which contain one 1,2-epoxide group per molecule and no other groups which are reactive with amine groups and which contain from about 8 to about 24 carbon atoms per molecule. Examples of monoepoxides are epoxidized hydrocarbons, epoxidized unsaturated fatty esters, monoglycidyl ethers of aliphatic alcohols and monoglycidyl esters of monocarboxylic acids. Examples of such monoepoxides are: epoxidized unsaturated hydrocarbons which contain 8 to 24 carbon atoms, e.g., octylene oxide, decylene oxide, dodecylene oxide and nonadecylene oxide; epoxidized monoalcohol esters of unsaturated fatty acids wherein the fatty acids contain about 8 to about 18 carbon atoms and the alcohol contains 1 to 6 carbon atoms, e.g., epoxidized methyl oleate, epoxidized n-butyl oleate, epoxidized methyl palmitoleate, epoxidized ethyl linoleate and the like; monoglycidyl ethers of monohydric alcohols which contain 5 to 21 carbon atoms, e.g., octyl glycidyl ether, decyl glycidyl ether, dodecyl glycidyl ether, tetradecyl glycidyl ether, hexadecyl glycidyl ether and octadecyl glycidyl ether; monoglycidyl esters of monocarboxylic acids which contain 8 to 20 carbon atoms, e.g., the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454 which is hereby incorporated by reference. Examples of such glycidyl esters are those derived from about 9 to about 19 carbon atoms, particularly Versatic 911 Acid, a product of Shell Oil Company, which acid contains 9 to 11 carbon atoms. The preferred monoepoxides are the monoglycidyl ethers of monohydric alcohols which alcohols contain 5 to 21 carbon atoms. The most preferred monoepoxides are the monoglycidyl ethers of monohydric alcohols which alcohols contain 12 to 14 carbon atoms.

Included in the definition of monoepoxides are monochlorohydrins, i.e., chlorohydrins of unsaturated hydrocarbons, chlorohydrins of unsaturated fatty esters, monochlorohydrin glyceryl ethers of aliphatic alcohols and monochlorohydrin glyceryl esters of monocarboxylic acids. As used in this invention, the term "monoepoxide" is intended to include "monochlorohydrin."

The polyamine collector is employed in a quantity between about 0.01–1.0 pound per ton, and preferably between about 0.25–0.5 pound per ton, of the pulped ore.

The polyamine collector compound used in the present invention can be prepared, for example, by the reaction of an appropriate aliphatic epoxide with diethylenetriamine diketimine or triethylenetetramine diketimine, in a manner similar to that described in U.S. Pat. No. 3,322,797. Two exemplary reactions are as follows:

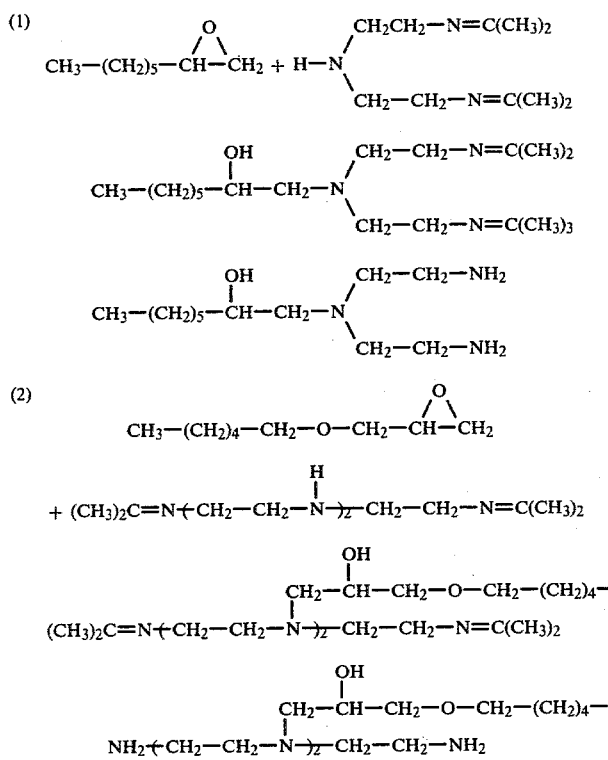

The polyamine collector of the present invention exhibits a unique ability to collect clay flocs selectively in preference to the potash values of the pulped ore being processed.

Ore Desliming And Recovery Of Potash Values

Illustrative of the present invention desliming method and a general procedure for subsequent recovery of potash values, sylvinite ore is crushed to flotation size and scrubbed for 20 minutes at 60 percent solids in saturated brine. The ore pulp is charged to a flotation machine and diluted to about 20 percent solids with saturated brine. The machine is set into operation, and a solution of polygalactomannan gum in brine is added. The ore pulp is conditioned briefly, and then the polyamine collector is added and the ore pulp is conditioned for another brief period. A frothing agent is added (e.g., methyl isobutyl carbinol), and after a conditioning period air is introduced into the flotation medium. The resulting siliceous froth is skimmed off.

The potash values are recovered from the deslimed ore pulp employing a conventional procedure. For example, the deslimed pulp is diluted with brine as necessary to a consistency of about 20–60 percent by weight solids. The various blinding agents, collecting agents and frothing agents are added to the ore pulp slurry. The ore pulp is then aerated to produce a froth on the flotation medium surface. The potash values are concentrated in the froth, and the remainder of the ore pulp consists essentially of halite and gangue. The potash-bearing froth is separated from the residual ore pulp and further processes to obtain the desired form of K$_2$O product.

A typical collecting agent for a potash flotation process is one which preferentially adheres to sylvite rather than halite, thereby producing a water repellent coating on the sylvite particles. Subsequently, the air bubbles cling to the potash particles and concentrate them in the froth. Commonly employed collecting agents for potash flotation include fatty amines such as dodecylamine hydrochloride and octadecylamine acetate.

The most commonly employed frothing agents for potash flotation include aliphatic alcohols containing between about 5–12 carbon atoms. In addition, if desired a slime binder such as starch or guar can be incorporated in the flotation medium to depress selectively any residual slime that may be present.

The following examples are further illustrative of the present invention. The reactants and other specific ingredients are presented as being typical, and various modifications can be devised in view of the foregoing disclosure within the scope of the invention. Parts and percentages are parts and percentage by weight unless otherwise specified.

EXAMPLE A

To a suitable reactor equipped with an azeotropic distillation well were added 573 parts of diethylene triamine and 1390 parts of methyiisobutyl ketone plus an additional 80 parts for the well. To the well were also added 700 parts of water. Heat was applied raising the temperature of the reactants to 104° C., at which point azeotropic distillation of water and methylisobutyl ketone began. The distilled water was retained in the well and the methylisobutyl ketone was returned to the reactor. During this distillation, the temperature slowly rose and when it reached 150° C., about 190 parts of distilled water had been collected. The refractive index of the reactants was 1.4500. Heating was discontinued allowing the temperature in the reactor to drop to 90° C. When this temperature was reached, 1587 parts of a monoglycidyl ether of mixed alcohols, predominantly n-dodecyl and n-tetradecyl alcohols, were added, said monoglycidyl ether having an epoxide equivalent weight of 286 and a viscosity at 25° C. of 8.5 cps. The reactants were heated to 121° C., at which point heating was discontinued. The temperature, however, rose to 140°–150° C. due to the exothermic reaction. The temperature was held at 150° C. for 30 minutes and was then lowered to 93° C.

The amount of water in the azeotropic distillation well was adjusted to 600 parts. 400 Parts of this water were then drained into the reactor leaving 200 parts in the well. Heat was applied raising the temperature to 93°–95° C. where distillation began. The methylisobutyl ketone distillate was removed while the water was returned to the reactor. The water level in the well was kept at the 200 parts mark. When about 1000 parts of methylisobutyl ketone had been distilled over, all the water from the well was drained into the reactor. Heating was continued until all the methylisobutyl ketone had been distilled from the reactor. The temperature was then raised to 149° C. while distilling off water. The temperature was held at 149° C. for 30 minutes while bubbling nitrogen gas through the reactor contents. After this time, the reactor contents had a non-volatiles content (0.4 gram sample heated at 150° C. for 20 minutes) of 90%. The reactor contents were cooled to 70°–75° C., were filtered and were stored in suitable containers.

The resulting product, at 90% N.V. in water, had a Gardner-Holdt viscosity at 25° C. of Y and a weight per gallon of 8.0 pounds.

EXAMPLE I

This example illustrates the flotation desliming of potash ore of high siliceous slime content obtained from the Hobbs-Carlsbad region of New Mexico.

The present invention method of flotation desliming was compared to conventional mechanical procedures for desliming potash ore.

Two mechanical desliming procedures were employed in the comparative tests. In both mechanical procedures 600 grams of dry ore and 400 grams of saturated brine (prepared from potash ore and tap water) were added to a one-liter stainless steel beaker and the ore pulp was scrubbed with a two-bladed laboratory paddle at a speed sufficient to suspend the solids for an elapsed time of 20 minutes.

In mechanical procedure (I), the scrubbed ore pulp was added to a two-liter graduate cylinder and diluted with brine to the two-liter mark. The cylinder was inverted three times, allowed to stand for 3 minutes, and then the liquid volume was decanted from the settled solids. Additional brine was added to the two-liter mark, and the inverting step was repeated and the liquid volume was decanted after 2 minutes of standing. The decanted slime was filtered, dried, and assayed for $K_2O$ and water-insolubles.

In mechanical procedure (II), the same materials and steps were employed, except that the settling times were 9 minutes and 6 minutes, respectively, instead of 3 minutes and 2 minutes as in procedure (I).

The present invention flotation desliming method was conducted as follows:

1. Scrubbing of the ore pulp for 20 minutes was performed in the same manner as for the mechanical desliming procedures described above, for the same purpose of loosening adhering clay slime from the surface of the ore pulp particles.

2. The scrubbed ore pulp was transferred to a 500 gram D-1 Denver Float Cell.

3. The float agitator was set in place, and the Float Cell was filled with saturated brine to ½-inch below the overflow lip.

4. The float agitator was set for 1200 rpm, without air flow introduction.

5. The flocculant was added, and the ore pulp was conditioned for 30 seconds without air flow. In the case of Jaguar MDD, the flocculant was prepared as a 0.5% brine solution.

6. The collector was added, and the ore pulp was conditioned for 2 minutes without air flow. In the case of Collector A, the collector was prepared as 1% aqueous solution, and the pH of the solution was adjusted to 6.5 or less with dilute acetic acid or hydrochloric acid.

7. Methyl isobutyl carbinol was added as a frothing agent.

8. The air flow introduction was commenced, and the slime froth was scraped into a collecting pan as rapidly as possible until a white barren froth was apparent. The average elapsed frothing time was about 3–4 minutes.

9. The collected slime was weighed wet, and then dried in an oven at 250° F. and weighed again. The % $K_2O$ and % water insolubles were determined. The assays were corrected for brine and salt in the standard manner.

The results of the potash ore desliming tests are summarized in Table I. The description of the flocculants in Table I is listed in Table II. The data indicate that the present invention process provided severalfold greater selectivity than the mechanical desliming procedures and about 20% better $K_2O$ recovery from the ore pulp.

TABLE I

| Flocculant | LB/T | Collector | LB/T | % INS-R | % $K_2O$-R | Sel. ratio |
|---|---|---|---|---|---|---|
| Mech. Desliming Procedure | | (I) | | 77.4 | 27.4 | 2.8 |
| Mech. Desliming Procedure | | (II) | | 71.6 | 23.3 | 3.1 |
| A | 0.20 | A | 0.10 | 50.2 | 4.4 | 11.4 |
| A | 0.20 | A | 0.25 | 58.4 | 4.7 | 12.4 |
| B | 0.20 | A | 0.25 | 64.0 | 5.1 | 12.5 |
| C | 0.20 | A | 0.25 | 61.0 | 3.8 | 16.1 |
| D | 0.20 | A | 0.25 | 61.3 | 4.2 | 14.6 |
| E | 0.10 | A | 0.25 | 64.5 | 7.9 | 8.2 |
| F | 0.10 | A | 0.25 | 68.5 | 8.5 | 8.1 |
| G | 0.10 | A | 0.25 | 70.8 | 10.9 | 6.5 |

*SELECTIVITY RATIO = % INSOL RECOVERY ÷ % $K_2O$ RECOVERY.
(Increasing ratio indicates increasing desliming efficiency.)

TABLE II

| Flocculant | Description |
|---|---|
| A | Underivatized guar gum, having the viscosity, 1% in water, of 2600–3500 cps at 25° C. |
| B | Hydroxypropyl guar having a minimum viscosity, 1% in water, of 3400 cps at 25° C. |
| C | Cationic guar, the 2-hydroxypropyl-3-trimethyl ammonium chloride ether, having a viscosity, 1% in water, of 3500 cps at 25° C. |
| D | Carboxymethyl-hydroxypropyl guar having a viscosity, 1% in water, of 3400 cps at 25° C. |

TABLE II-continued

| Flocculant | Description |
| --- | --- |
| E | Moderately hydrolyzed high molecular weight polyacrylamide, having a viscosity, 1% in water, of 4500 to 5500 cps at 25° C. |
| F | Slightly hydrolyzed high molecular weight polyacrylamide, having a viscosity, 1% in water, of 1000–2000 cps at 25° C. |
| G | Nonionic polyacrylamide, having a viscosity, 1% in water, of 400–900 cps at 25° C. |

EXAMPLE II

This example illustrates the desliming of a potash ore of high clay content which is from a different mine in New Mexico than that in Example I.

Mechanical desliming was accomplished by employing 700 gram samples of potash ore. The commercial plant process was simulated by scrubbing the ore pulp for about 5 minutes at 60% solids in plant brine with a two-blade paddle mixer to release siliceous gangue. This operation was followed by dilution with brine and decantation by siphoning off the slime after 30 seconds of further agitation and about one minute of settling. The dilution and decantation procedure was repeated two more times.

The procedure corresponding to the present invention potash ore desliming process was commenced with 5 minutes of scrubbing as described above. Then the scrubbed ore pulp was transferred to a 500 gram D-1 Denver Float Cell, and the subsequent procedure was in accordance with that described in Example I.

The results of the potash ore desliming tests are summarized in Table III. The data demonstrate the superior desliming efficiency provided by the present invention process in comparison with a conventional mechanical desliming procedure.

TABLE III

| Flocculant | LB/T | Collector | LB/T | % INS-R | % $K_2O$-R | Sel. ratio |
| --- | --- | --- | --- | --- | --- | --- |
| Mech, Desliming | | | | 78.6 | 12.8 | 6.4 |
| A | 0.6 | A | 0.75 | 79.2 | 5.6 | 14.1 |
| A | 0.4 | A | 0.50 | 73.6 | 4.1 | 18.0 |
| A | 0.2 | A | 0.25 | 78.5 | 4.5 | 17.4 |

TABLE IV

| Flocculant | LB/T | Collector | LB/T | % INS-R | % $K_2O$-R | Sel. ratio |
| --- | --- | --- | --- | --- | --- | --- |
| S-3171[1] | 0.05 | Aero-870[2] | 0.05 | 49.5 | 3.5 | 14.0 |
| A | 0.10 | A | 0.125 | 56.2 | 3.2 | 17.6 |
| A | 0.075 | A | 0.05 | 52.5 | 2.2 | 24.0 |
| A | 0.05 | A | 0.06 | 53.5 | 2.5 | 21.4 |

[1] Nonionic intermediate polyacrylamide, American Cyanamid
[2] Fatty amine, American Cyanamid.

EXAMPLE III

This example illustrates the desliming of a potash ore from a Saskatchewan mine.

The scrubbing and flotation procedure for desliming corresponded to that employed at the mine plant from which the ore was obtained.

The present invention flotation desliming process was compared to one in which a polyacrylamide flocculant and a fatty amine collector were employed.

The results of the comparative potash desliming tests are summarized in Table IV.

The data indicate that the present invention process provided more efficient desliming than did the flotation desliming method not in accordance with the present invention process.

Because it will be readily apparent to those skilled in the art that ennumerable variations, modifications, applications, and extensions of the examples and principles hereinbefore set forth can be made without departing from the spirit and scope of the invention, what is herein defined as such scope and is desired to be protected should be measured, and the invention should be limited, only by the following claims.

What is claimed is:

1. A process for desliming a potash ore which comprises (1) pulping the ore in saturated brine; (2) treating the pulped ore with about 0.005–0.5 pound per ton of a polygalactomannan gum flocculant, and with about 0.01–1.0 pound per ton of a polyamine collector for the siliceous slime; (3) subjecting the treated ore pulp to froth flotation conditions, and (4) removing the floated siliceous slime; wherein the polyamine collector is a compound corresponding to the formula:

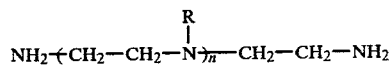

wherein R is an aliphatic substituent containing between about 8–24 carbon atoms, between about 1–3 oxygen atoms and is derived from a monoepoxide, n is the integer 1 or 2, and one of the R substituents can be hydrogen when n is 2.

2. The process of claim 1, wherein the monoepoxide contains one 1,2-epoxide group per molecule and no other groups which are reactive with amine groups and contains about 8 to about 24 carbon atoms per molecule and is selected from the group consisting of epoxidized hydrocarbons, epoxidized unsaturated fatty esters, monoglycidyl ethers of aliphatic alcohols and monoglycidyl esters of monocarboxylic acids.

3. The process of claim 1 wherein the monoepoxide is a monoglycidyl ether of a fatty alcohol which alcohol contains about 5 to about 21 carbon atoms.

4. The process of claim 1 wherein the monoepoxide is a monoglycidyl ether of a fatty alcohol which alcohol contains about 12 to about 14 carbon atoms and n is 1.

5. The process of claim 1 wherein the maximum particle size of the pulped ore is in the range of about 4 to about 10 mesh.

6. The process of claim 1 wherein the flocculant is present in the amount of about 0.025 to about 0.25 pound per ton of ore.

7. The process of claim 1 wherein the collector is present in the amount of about 0.25 to about 0.5 pound per ton of ore.

8. The process of claim 1 wherein the polygalactomannan gum is guar gum.

9. The process of claim 8 wherein the guar gum is a derivatized guar gum.

10. The process of claim 9 wherein the derivatized guar gum is selected from the group consisting of carboxyalkyl guar, hydroxyalkyl guar, carboxyalkylhydroxyalkyl guar gum and quaternary ammonium hydroxyalkyl guar.

* * * * *